United States Patent
Broehl

(10) Patent No.: US 7,166,815 B2
(45) Date of Patent: Jan. 23, 2007

(54) SHORT-TIME ARC WELDING SYSTEM AND METHOD

(75) Inventor: Reinhold Broehl, Staufenberg (DE)

(73) Assignee: Newfrey LLC, Newark, DE (US)

( * ) Notice: Subject to any disclaimer, the term of this patent is extended or adjusted under 35 U.S.C. 154(b) by 216 days.

(21) Appl. No.: 10/920,144

(22) Filed: Aug. 17, 2004

(65) Prior Publication Data

US 2005/0056620 A1    Mar. 17, 2005

Related U.S. Application Data

(63) Continuation of application No. PCT/EP03/01468, filed on Feb. 14, 2003.

(30) Foreign Application Priority Data

Feb. 20, 2002  (DE) ................................ 102 07 726

(51) Int. Cl.
  *B23K 9/20*   (2006.01)
(52) U.S. Cl. .......................................... 219/99; 219/98
(58) Field of Classification Search .................. 219/98, 219/99
  See application file for complete search history.

(56) References Cited

U.S. PATENT DOCUMENTS

| | | | |
|---|---|---|---|
| 2,945,118 A | 7/1960 | Keleman et al. | |
| 3,940,588 A | 2/1976 | Oehry et al. | |
| 5,252,802 A | 10/1993 | Raycher | |
| 6,011,234 A | 1/2000 | Kirchner et al. | |
| 6,933,458 B2 * | 8/2005 | Citrich et al. ................. | 219/98 |

FOREIGN PATENT DOCUMENTS

| | | | |
|---|---|---|---|
| DE | 43 24 223 | | 1/1995 |
| DE | 200 03 127 | | 6/2000 |
| EP | 1123769 | | 8/2001 |
| GB | 2092044 | | 8/1982 |
| JP | 60-9585 A | * | 1/1985 |
| WO | WO 96/05015 | | 2/1996 |
| WO | WO 96/11767 | | 4/1996 |
| WO | WO01/62426 A1 | * | 8/2001 |
| WO | WO 03/013776 | | 2/2003 |
| WO | WO 03/020466 | | 3/2003 |
| WO | WO 03/070412 | | 8/2003 |

OTHER PUBLICATIONS

International Search Report, Nov. 6, 2003 (3 pgs).
Stud Welding Logic. A New Tucker Technology!, dated Sep. 1999.

* cited by examiner

*Primary Examiner*—Clifford C. Shaw
(74) *Attorney, Agent, or Firm*—Harness, Dickey & Pierce, P.L.C.

(57) ABSTRACT

A short-time arc welding system and method for welding elements on parts includes: a robot having an arm moveable in at least one coordinate axis; a welding head mounted on the arm having a holding device to hold an element, and a lifting device for advancing and returning the holding device, and; a measuring system for determining a relative position between the part and the element. The measuring system includes: a foot mounted on the welding head which contacts the part during operation to determine the relative position; and a positioning device to position the foot relative to the element in at least two different operating positions. A storage device stores a plurality of welding positions. The measuring system positions the foot in an operating position for each stored welding position.

28 Claims, 2 Drawing Sheets

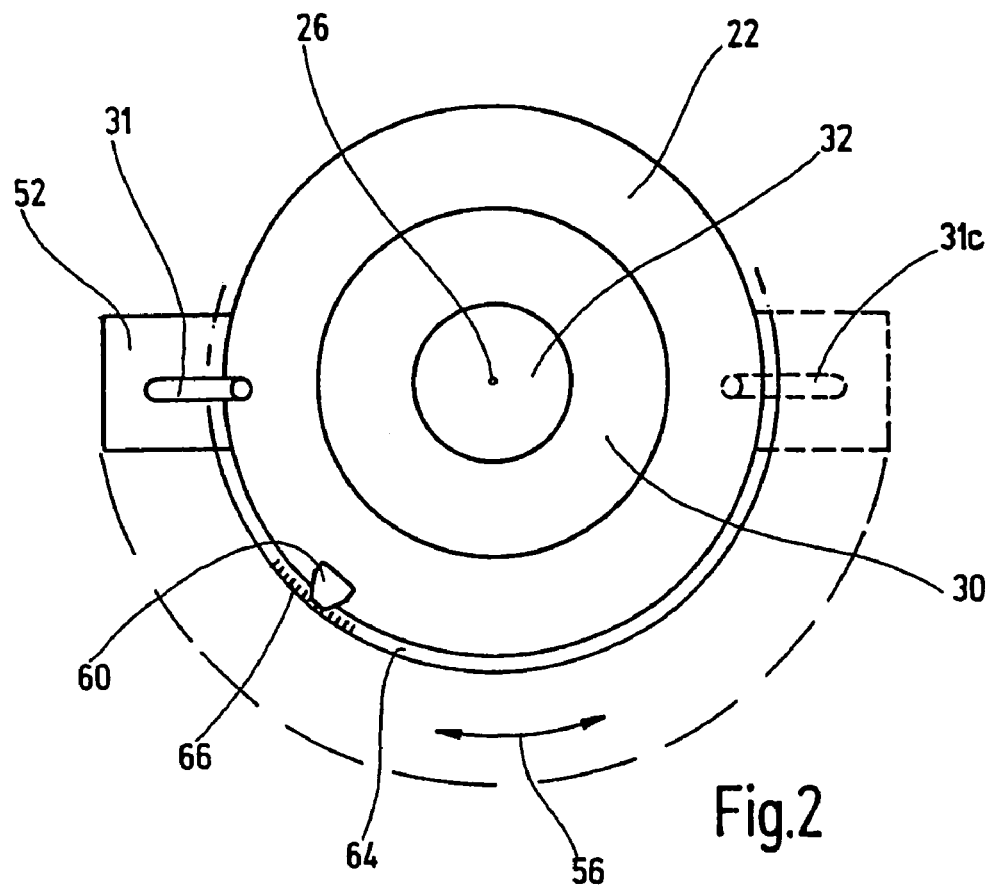
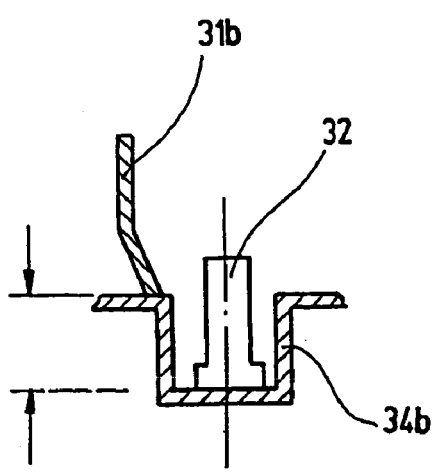
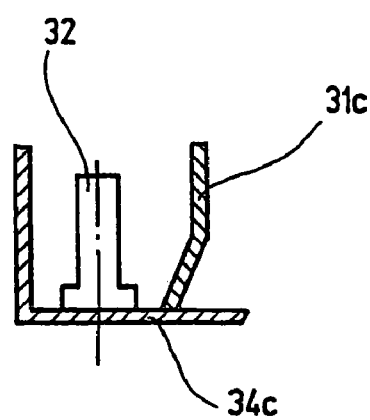

SHORT-TIME ARC WELDING SYSTEM AND METHOD

CROSS-REFERENCE TO RELATED APPLICATIONS

This application is a continuation of PCT/EP03/01468, filed Feb. 14, 2003 and designating the U.S., which was not published under PCT Article 21(2) in English, and claims priority to German application DE 102 07 726.6, filed Feb. 20, 2002, whose disclosures are incorporated herein by reference.

FIELD OF THE INVENTION

The present invention relates to a short-time arc welding system for welding elements such as metal studs onto components such as metal sheets, having:
- a robot which has at least one arm which can move on at least one coordinate axis,
- a welding head which is mounted on the arm and on which a holding apparatus for holding an element, and a linear-movement apparatus for moving the holding apparatus forwards and backwards relative to the welding head are provided,
- a measurement system for determining the relative position between a component and an element which is to be welded onto the component and is held by the holding apparatus, with the measurement system having a foot which is mounted on the welding head and is designed, during operation, to make contact with the component in order to determine the relative position between the element and the component, and
- a memory device in which a number of welding positions can be stored.

The present invention also relates to a corresponding method for short-time arc welding. A short-time arc welding system such as this and an associated method are generally known.

BACKGROUND OF THE INVENTION

During short-time arc welding, an element is welded onto a component. In this case, an arc is formed between the element and the component, which melts the end surfaces. The element and the component are then moved towards one another, so that the melts mix. The arc is short-circuited, and the entire melt solidifies.

Normally, the arc is drawn (welding with drawn arc). In this case, the element is first of all placed on the component. A pilot current is then switched on, and the element is raised to a desired height above the component, with an arc being drawn. The welding current is not switched on until this point.

In order to achieve constantly good welding results, it is important, inter alia, to know the relative position between the element and the component, in particular to raise the element to the correct height before the welding current is switched on. To this end, the relative position is generally measured before each welding process, in particular in the form of a null position being determined.

This is particularly important for robot-based systems. Modern robots are admittedly generally able to position themselves comparatively precisely. However, particularly owing to the large moving masses, high precision cannot be achieved at the same time as a very fast dynamic response.

The robots can normally move in three co-ordinates. In the simplest case, a robot is a linear guide (slide) which is driven in an automated manner and on which a welding head is mounted.

Stud welding systems are used in particular in the motor vehicle industry where they are used, in particular, to weld elements such as bolts or studs with or without a thread, eyelet, nuts etc. to the sheet-metal bodywork. These elements are then used as holding anchors in order, for example, to fix internal linings.

The production speed is a major factor in the motor vehicle industry. Hundreds of the elements must be welded automatically by means of robots at different positions within a few minutes. In consequence, the robots have to have a short-time dynamic response.

It is thus known for a welding head base supporting a slide to be fitted to the arm of a robot. The slide can be moved highly dynamically with high precision, normally by means of a pneumatic or hydraulic system. The actual welding head is mounted on the slide and itself has a linear movement apparatus for moving the element.

In order to determine the relative position between the element and the component, it is known for a so-called supporting foot to be attached to the welding head (for example from "Neue TUCKER-Technologie. Bolzenschweißen mit System", Emhart Tucker, September 1999). The supporting foot is aligned approximately parallel to the holding apparatus of the welding head. In an initial position, the element which is held in the holding apparatus projects somewhat beyond the supporting foot.

In order to determine the relative position, the welding head is moved towards the component. In the process, the element first of all makes contact with the component. The welding head is fed further forwards until the supporting foot makes contact with the component. In the process, the holding apparatus is generally offset relative to the welding head, against an elastic biasing force. The interlocking contact between the supporting foot and the welding head, together with a suitable measurement system in consequence allow the relative position between the element and the component to be determined.

As an alternative to this, so-called measurement systems without supporting feet are also known for determining the relative position between the element and the component. For example, U.S. Pat. No. 5,252,802 discloses a bolt welding apparatus with a housing which is in the form of a handheld pistol. A position motor first of all moves the housing to a position in which a bolt is arranged in the vicinity of a component. A linear motor is provided in the housing, in order to move a linear-movement shaft, which carries the stud, axially. A movement measurement system is provided in order to control the linear motor. To determine the relative position between the stud and the workpiece, the linear motor is driven in order to move the stud towards the workpiece at a predetermined speed. As soon as the stud touches the workpiece, an electrical contact is closed. Furthermore, it is known from WO 96/11767 for the stud holder to be elastically biased in the direction of the workpiece, and to be moved axially against the bias force by means of a linear motor.

WO 96/05015 also discloses a stud welding apparatus without a supporting foot. However, stud welding without a supporting foot has the disadvantage that, particularly if the components are thin metal sheets, it is not always possible to exactly maintain an exact position relationship between this component and the element or bolt. This is due to the fact that thin sheet metal is frequently bent somewhat when the bolt makes contact with it. As soon as the bolt is lifted off the metal sheet again during the process of raising it to draw an arc, the metal sheet moves back, and the exact position relationship is lost.

Essentially, this problem does not exist in stud welding with a supporting foot. This is because the supporting foot makes contact with the component or metal sheet throughout the entire welding process. In consequence, this mechanical coupling always makes it possible to maintain an exact position relationship.

However, stud welding with a supporting foot has the disadvantage that the supporting foot, which is necessarily arranged close to the stud, increases the amount of space required for stud welding. Furthermore, spot welds must generally be arranged where the component is planar. In the region of steps or depressions, it is frequently necessary to rotate the arm of the robot so that the supporting foot does not impede the movement of the welding head. This means that the supply lines to the welding head are subject to high stress levels resulting from torsion, compression etc.

SUMMARY OF THE INVENTION

Against the above background, one object of the present invention is to specify an improved short-time arc welding system and method for short-time arc welding. In the case of the short-time arc welding system mentioned at the outset, this object is achieved in that the measurement system furthermore has positioning means in order to position the foot in a large number of at least two different operating positions relative to an element which is held in the welding head, and in that the measurement system is designed to position the foot in a respectively suitable operating position for each stored welding position.

In the case of the short-time arc welding method mentioned at the outset, the object is achieved by using a short-time arc welding system for the method, which has a control device in which a respective suitable operating position for a foot is stored for a number of welding processes which can be carried out automatically, which foot is designed to make contact with the component in order to determine the relative position between the element and the component, in which the method, furthermore, has the following steps:

a) actuation of a robot with an arm such that a welding head which is fixed on the arm is moved to a welding position for a chosen welding process,
b) positioning of the foot in an operating position which is suitable for the chosen welding process,
c) movement of the element towards the component until the foot makes contact with the component, and
d) carrying out the chosen welding process.

The invention makes it possible to carry out stud welding with a supporting foot on components with any desired contour. In the present context, the expression of an operating position for a foot in each case means a position of the foot in which the foot is used to determine the relative position between the element and the component. In consequence the foot is designed to make contact with the component in every operating position, in contrast to being in a rest position.

This makes it possible to make use of the advantages of stud welding with a supporting foot for all welding processes. The relative movement capability between the supporting foot and the stud makes it possible to carry out welding processes at any desired points without the supporting foot being "in the way".

It is particularly advantageous for the positioning means to be designed such that the foot can be positioned in a large number of positions relative to the element being held, approximately parallel to a welding axis along which the elements are welded to the components. This makes it possible to weld on welding elements even in regions in which there are depressions in the components. The relative "height" of the supporting foot can then be matched to the depth of this depression.

According to a further preferred embodiment, positioning means are designed to position the foot in at least two different positions relative to the element being held, about an axis which is parallel to a welding axis along which the elements are welded to the components. These features are regarded as an invention of their own, in conjunction with the precharacterizing clause of the main claim.

As a result of the measure of designing the foot such that it can move around a parallel axis, in particular around the welding axis itself, it is possible to weld on elements even in the region of steps or edges of the components, without the robot arm having to carry out extreme movements. In consequence, the supply lines to the welding head at the end of the robot arm are protected against excessive stresses such as compression, twisting etc. Furthermore, since the extent of the robot movements can be reduced, it is possible to achieve a shorter cycle time between individual welding processes.

Furthermore, it is preferable for the positioning means to have a foot movement sensor which detects the position of the foot. This makes it possible to control the positioning of the foot relative to the element held in the welding head. This makes it possible to achieve a high positioning accuracy even in the case of frequent repetitions. Since the foot length can vary over the course of time owing to wear, erosion or material deposits etc., a closed control system for foot positioning also allows regular calibration. This makes it possible to compensate for changes to the foot length.

In a further preferred embodiment, the welding head has elastic means in order to elastically bias the holding apparatus in the feed direction. This measure allows the linear-movement apparatus for moving the holding apparatus forwards and backwards, to be held in most operating states without consuming any energy. This reduces the energy consumption.

In a further preferred embodiment, the measurement system has a movement sensor which detects the movement of the holding apparatus relative to the welding head. Furthermore, it is preferable for the positioning means to be designed to position the foot relative to the welding head. Since an element which is held by the holding apparatus generally has a known position relationship with the welding head, the relative movement between the foot and welding head can be used to determine an exact position relationship between the foot and the element. Alternatively, relative positioning between the foot and holding apparatus is feasible.

Furthermore, it is advantageous for the positioning means to have a motor and, in the rest state, for the motor to apply a resistance torque which is preferably greater than approximately 150 N with respect to axial motor movements. It is particularly preferable for the resistance torque to be more than 200 N. When it is approaching the component, the foot is moved with a not inconsiderable force until the foot makes contact with the component. A motor with the intended resistance torque with respect to motor movements from the rest state allows the selected position to be maintained even if the foot strikes the component relatively hard. In consequence, the position which is set in advance by the motor is maintained.

According to a further preferred embodiment, the positioning means have clamping means in order to fix the foot in the axial direction with respect to the element being held, in the rest state. In this embodiment, it is not absolutely essential for a motor for the positioning means to have a high resistance torque with respect to axial movements. In addition to, or instead of, this, the clamping means ensure that the foot remains in the position set by the motor even if the foot strikes the component with a high force, or at a high speed.

In the method according to the invention for short-time arc welding, it is furthermore advantageous for steps a) and b) to be carried out such that they overlap. This allows the supporting foot to be moved in a time-saving manner to the respectively suitable foot position during the movement of the robot to a new welding position.

It is self-evident that the features mentioned above and those which are still to be explained in the following text can be used not only in the respectively stated combination, but also in other combinations or on their own, without departing from the scope of the present invention.

BRIEF DESCRIPTION OF THE DRAWINGS

Exemplary embodiments of the invention are explained in more detail in the following description and are illustrated in the drawing, in which:

FIG. 2 shows a schematic view of the welding head of the short-time arc welding system, shown in FIG. 1, from below;

FIG. 3 shows a schematic illustration of a welding process in a depression of a component; and FIG. 4 shows a schematic illustration of a welding process on a shoulder of a component.

DETAILED DESCRIPTION OF THE PREFERRED EMBODIMENTS

Figure 1:
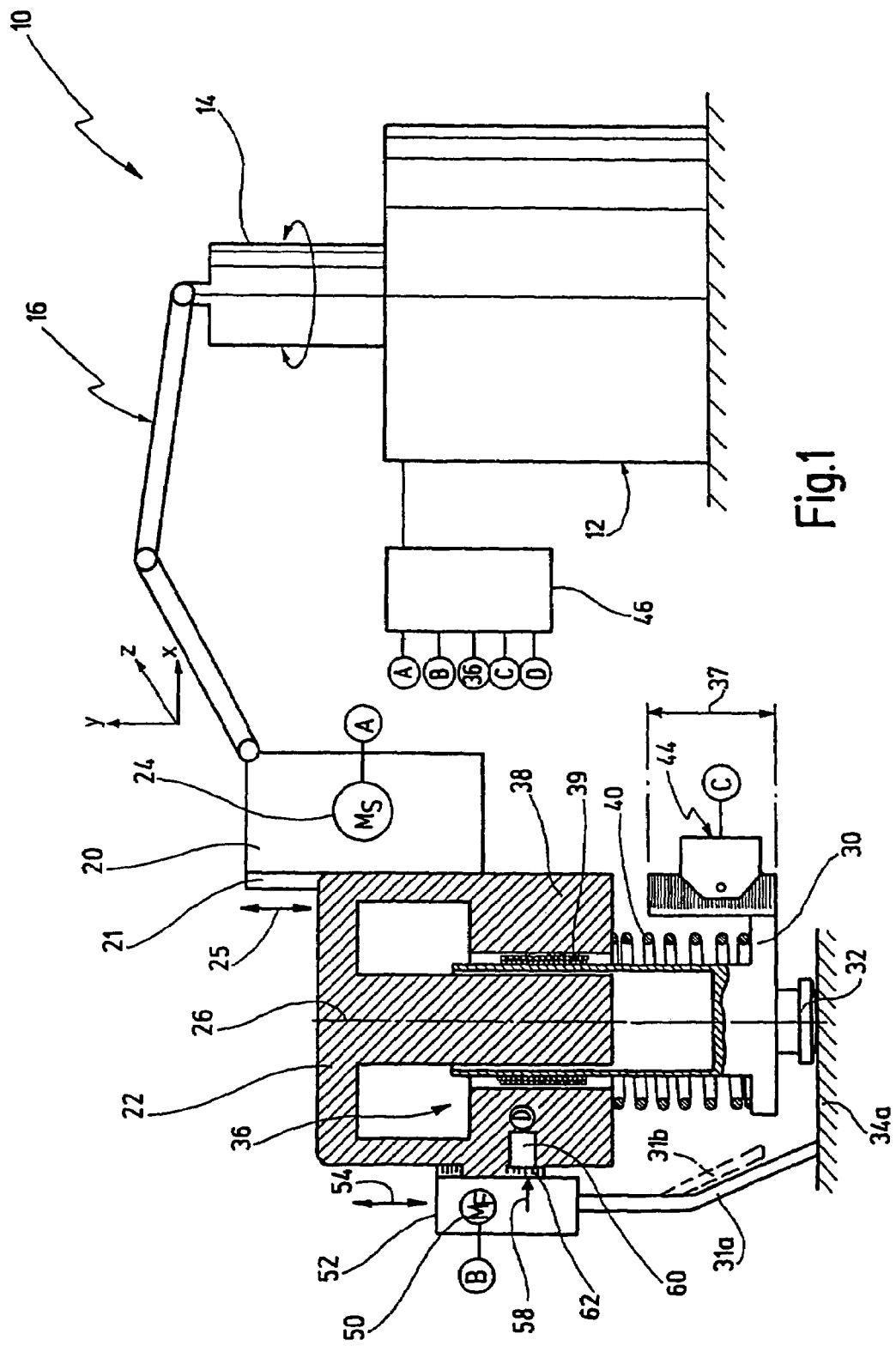
FIG. 1 shows a schematic view of a first embodiment of a short-time arc welding system according to the invention.

In FIG. 1, a first embodiment of a short-time arc welding system according to the invention is annotated 10 in general. The short-time arc welding system 10, which is referred to for short in the following text as the stud welding system 10, contains a robot 12. The robot 12 has a rotating head 14, by means of which a single-joint or multiple-joint arm 16 can be rotated. Overall, the robot 12 is designed to move the end of the arm freely on three co-ordinate axes x, y, z.

A welding head base 20 is fitted to the end of the robot arm 16. The welding head base 20 supports a slide 21, which can be moved in a reciprocating manner parallel to an axis 26 relative to the welding head base 20. A welding head 22 is mounted on the slide 21. A pneumatic arrangement 24 is used to move the welding head 22 in a reciprocating manner with respect to the welding head base 20 by means of the slide 21. The welding head 22 has a holding apparatus 30, which is designed to hold a metal element such as a bolt 32, detachably. For this purpose, the holding apparatus 30 has suitable clamping means, which are not shown in any greater detail in FIG. 1. FIG. 1 furthermore shows a metal component, such as a metal sheet 34, which is essentially aligned at right angles to the axis 26. A supporting foot 31 is furthermore provided on the welding head base 20.

The welding head 22 furthermore has a linear-movement apparatus 36. The linear-movement apparatus 36 is used to cause the holding apparatus 30 to move in an axial direction, which is aligned parallel to the axis 26, with respect to the welding head 22. The linear-movement apparatus 30 has a linear movement stroke 37 which may be, for example, in the range between 8 mm and 20 mm, in particular in the range between 10 mm and 15 mm. In comparison to this, the linear movement stroke of the pneumatic arrangement 24 may be in the range between 2 cm and 10 cm, in particular in the range between 4 cm and 6 cm.

As a rule, the linear-movement apparatus 36 is formed by a linear motor. In the illustrated embodiment, the linear-movement apparatus 36 is, however, formed by a spring and magnet system. The welding head 22 has a permanent magnet 38. A coil 39, which can be energized in a controlled manner, is formed on a sleeve-shaped section of the holding apparatus 30. When energized, the holding apparatus 30 is drawn into the welding head 22, against the influence of a compression spring 40. The compression spring 40 acts, on the one hand, on the welding head 22 or on the moving part of the slide 21, and, on the other hand, on the holding apparatus 30.

The welding head 22 also has a movement sensor 44, which is indicated only schematically in FIG. 1. The movement sensor 44 is used to detect the relative position between the holding apparatus 30 and the welding head 22. For this purpose, the movement sensor 44 may have a code reader on the holding apparatus 30, which reads a linear code on the welding head 22 (or vice versa).

A control device 46 is also provided. The control device 46 is connected to the robot 12 and to the pneumatic arrangement 24, to the linear-movement apparatus 36, and to the movement sensor 44. The control device 46 is used to control the moving elements of the bolt welding system 10, in a manner coordinated with respect to one another, and to close-loop control their movement, speed and/or acceleration on the basis of the signals from the movement sensor 44.

The relative position between the element 32 and the component 34 is in general determined as follows. In an initial position, the coil 39 is not energized. The holding apparatus 30 protrudes from the welding head 22 to the maximum extent. The component 32, in this situation, projects somewhat beyond the axial end of the supporting foot 31. The welding head 22 is then moved towards the component 34 by means of the actuating drive 24, until the element 32 makes contact with the component 34. This movement is continued until the axial end of the supporting foot 31 makes contact with the component 34. The movement of the actuating drive 24 is interrupted at this point. This position is shown in FIG. 1.

The welding process is then carried out as normal, by supplying a pilot current through the element 32 and through the component 34, with the element 32 then being raised off the component 34. The supporting foot 31 prevents the "component 34 from bouncing back". As soon as the element 32 has been raised through a suitable distance from the component 34, the actual welding current is switched on. The mutually opposite surfaces melt. The bolt 32 is then lowered onto the component 34, generally to below the position illustrated in FIG. 1, so that it enters the melt of the component 34. On reaching the component 34, the welding current is switched off. The entire melt solidifies, and the welding process is complete.

It is self-evident that, if a linear motor is used as the linear-movement apparatus 36, it is also possible for the welding head 22 to approach the component 34, with the holding apparatus 30 being located in a drawn-back position, that is to say with the element 32 not projecting beyond the axial end of the supporting foot 31. In this situation, the welding head 22 approaches until the supporting foot 31 makes contact with the component 34. The linear motor of the linear-movement apparatus 36 is then operated, in order to lower the element 32 as far as onto the component 34. Both methods ensure that there is an exact position relationship between the element 32 and the supporting foot 31 or component 34 throughout the entire welding process.

According to the invention, the supporting foot 31 is designed such that it can be moved by means of an actuating drive 50. The actuating drive 50 is provided in a drive housing 52, which is mounted on an outer face of the welding head 22 such that it can move. As is shown in FIG. 1, the actuating drive 50 is able to move the supporting foot 31, which is mounted rigidly on the drive housing 52, up and down in a direction 54 approximately parallel to the welding axis 26. In this case, it is preferable for the actuating drive 50 to have a stepping motor, which can move the supporting foot 31 to a large number of different axial positions relative to the welding head 22, in increments which are generally less than 1 mm.

As is shown in FIG. 2, which illustrates the welding head 22 from below, the drive housing 52 can be moved together with the supporting foot 31 that is mounted on it, around the pivoting axis 26, as is indicated schematically at 56. The range of movement is generally between 90 and 270° and is 180° in the illustrated exemplary embodiment. The capability of the supporting foot 31 to move relative to the welding head 22, and hence also relative to the element 32 allows welding processes to be carried out on any desired contours of the component 34.

Furthermore, a clamping device 58 is indicated schematically in FIG. 1. The clamping device 58 is used to clamp the supporting foot 31 firmly in a respective operating position on the welding head 22. The clamping effect in this case acts primary in the axial direction. This prevents the supporting foot 31 from being moved out of the operating position relative to the welding head 22 when the welding head 22 is moved towards the metal sheet 34 and the supporting foot 31 touches the metal sheet 34.

If the actuating drive 50 applies a sufficiently large resistance torque with respect to axial movements of the supporting foot 31 relative to the welding head 22 in the rest state, there is no need for the clamping device 58. The holding force from the motor (its resistance torque) should preferably be greater than approximately 150 N and particularly preferably greater than 200 N.

FIG. 1 also shows a foot movement sensor 60. The foot movement sensor 60 is designed to detect the relative position between the supporting foot 31 and the welding head 22. In the simplest case, the foot movement sensor 60 detects a marking 62 on a part of the supporting foot 31 or of the drive housing 52, which can move relative to the welding head 22. The marking which is indicated at 62 in FIG. 1 is used for detecting the axial position of the supporting foot 31 with respect to the welding head 22. FIG. 2 also shows that a crown 64, which rotates with the drive housing 52, is provided on the welding head 22. A further marking 66 is provided on the crown 64, and can be detected by the movement sensor 60. In consequence, the foot movement sensor 60 can also detect the angular position of the supporting foot 31 with respect to the welding head 22.

It is self-evident that the illustrated embodiments of foot movement sensors are only by way of example. The critical factor is that the foot movement sensor 60 can detect the relative position between the supporting foot 31 and the welding head 22. The information about this relative position is supplied to the control device 46. The control device 46 has a closed control loop, in order to set the respectively desired operating position of the supporting foot 31 with respect to the welding head 22. It is self-evident that this control loop can be calibrated in order to compensate for changes in the effective length of the supporting foot 31, for example resulting from wear, erosion, material deposits, or the like.

It is furthermore self-evident that the movement measurement system for detecting the relative position between the supporting foot 31 and the welding head 22, and the movement measurement system 44 for detecting the relative position between the bolt 32 and the welding head 22 can be matched to one another. In consequence, the relative position of all the critical moving elements of the welding head base 22 is known at all times.

With regard to the contour of the component 34, FIG. 1 shows a standard situation, which is identified by the index "a". The component 34 is virtually planar in the region of the welding point. In consequence, the supporting foot 31 is located in a position in which known welding systems have mounted the supporting foot rigidly.

FIG. 3 shows, in a schematic form, a welding process for a bolt-like element 32 in a groove in a component 34b. The groove is so narrow that the supporting foot 31 makes contact in the edge region of the groove, as is shown at 31b. The position 31b is likewise shown by dashed lines in FIG. 1.

A welding process with the supporting foot would not have been possible with known welding systems. However, in the present case, the supporting foot 31 is moved to a suitable position, namely the position 31b as determined by a teach-in process, before the welding head 22 approaches the component 34b. It then makes its approach in the same way as that described above.

FIG. 4 illustrates a situation in which a welding bolt is intended to be placed in the vicinity of a shoulder on a component 34c. In this embodiment, the shoulder is located at the point at which the supporting foot 31 would conventionally be located if the welding head were to approach the shoulder in a straight line. In consequence, in the prior art, the robot 12 would have to rotate the welding head 22 through at least 90° before making its approach. This would result in the supply lines to the welding head 22 being twisted and possibly compressed. In the present case, the welding head 22 can be guided on a straight path directly to the welding point. Even before its approach or during the movement of the welding head base 22 by means of the robot 12, the supporting foot 31 is pivoted through 180° by means of the actuating drive 50, to the position 31c shown in FIG. 4.

In an alternative process for determining the relative position between the element 32 and the component 34 without a supporting foot, the supporting foot 31 is moved to a rest position, and is not used. In this method, which is not illustrated in any more detail in the figures, the relative position is determined, for example, as follows:

First of all, the control device 46 is electrically connected to the stud 32 via cables which are not illustrated in any more detail. Furthermore, the control device 46 is able to apply a measurement voltage to the stud 32. For example, the component 34 may be grounded, so that it is possible to use a suitable current measurement apparatus to detect the point of time when the element 32 makes electrical contact with the component 34.

The robot 12 is first of all actuated in order to move the welding head base 20 by means of the rotary head 14 and the robot arm 16 to a basic welding position, which is shown in FIG. 1. In this position, the welding head base 20 is located at a specific distance from the component 34, with the axis 26 being at right angles to the desired welding position on the component 34.

The pneumatic arrangement 24 is then operated, so that the welding head 32 is moved in the direction towards the component 34, to be precise through its full stroke, as far as a head welding position. In the final position, the element 32 is located at a distance from the component 34 which is shorter than the maximum stroke 37 of the linear-movement apparatus 36.

The linear-movement apparatus 36 is then operated such that the element 32 is moved towards the component 34, until it makes contact with the component 34. This movement is preferably carried out at a constant speed. In this case, the distance traveled is detected by means of the movement sensor 44. As soon as the element 32 makes contact with the component 34, a circuit created by the measurement voltage is closed. This is detected by the control device 46, and the linear-movement apparatus 36 is stopped.

Furthermore, the contact position between the element 32 and the component 34 at this time is used as the "null position" for the rest of the welding process. In consequence, the exact relative position between the element 32 and the component 34 is in each case known throughout the entire subsequent welding process via the movement sensor 44, provided the component 34 does not "bounce back" when the element 32 is lifted off. The welding process can in consequence be carried out independently of any tolerances that there may be in the positioning by the robot 12 or by the pneumatic arrangement 24, with the desired position relationship between the element 32 and the component 34.

The actual stud welding process is then carried out in a manner known per se. In this case—once the measurement voltage has been switched off—a pilot current is applied to the element 32. The element 32 is then raised off the component 34, so that an arc is drawn. Once a specific height is reached, the actual welding current is switched on, thus increasing the energy of the arc, so that the end face of the element 32 and the associated point on the component 34 are melted. The linear-movement apparatus 36 then moves the element 32 back towards the component. As soon as electrical contact is made once again, the arc is short-circuited, and the welding current is switched off.

In general, the feed movement process continues to a point somewhat below the surface of the component 34, so that the melts on both sides are mixed well together. The entire melt solidifies, and the actual welding process is complete. The holding apparatus releases the element 32. The linear-movement apparatus 36 is then switched off. The linear-movement apparatus 30 is then moved back to the retracted rest position by the spring 40. Furthermore, after this or in parallel with it, the pneumatic arrangement 24 is actuated by the control device 46 so that the welding head 22 is moved back to the retracted initial position.

In all the embodiments, the element 32 can approach the component 34 in a highly dynamic manner and with high precision. The combination of the control device 46, the movement sensor and the linear-movement apparatus 36 is then preferably used to determine the relative position between the element 32 and the component 34, preferably with, or possibly also without, a supporting foot 31.

In some cases, it may be sufficient to move the end of the robot arm directly, that is to say without a slide 24 or a moveable component, to a position in which the element 32 is located in the position at the end of the approach process. This applies in particular when the holding apparatus 30 is pre-stressed or biased elastically to a rest position with respect to the welding head 22 by elastic means, such as the spring 40. In one alternative embodiment, the robot 12 and the slide 21 may also be replaced by a single linear guide, which is driven in an automated manner.

From what has been stated above, it is self-evident that, in a simplified embodiment, the supporting foot 31 is merely moved backwards and forwards between two axial positions. Both axial positions are operating positions, which means that the supporting foot 31 is used to make contact with the component (metal sheet) 34 in both operating positions, in order to determine the relative position between the element (bolt) 32 and the component (metal sheet) 34. A freely variable axial position is, of course, more ideal.

In an alternative simplified embodiment, the supporting foot 31 is simply pivoted backwards and forwards in a corresponding manner between two angular positions. Both angular positions are operating positions, in the above sense.

Although an embodiment in which the supporting foot is pivoted around the pivoting axis is described above, embodiments are also feasible in which it is pivoted about an axis parallel to this. Since the supporting foot is frequently designed with a bend at its free end, it is also possible to pivot the supporting foot about its own axis.

In addition, it is also possible to set up not only the operating positions but also a single rest position, in which the supporting foot 31 is not in operation. This is because, in certain circumstances, it may be worthwhile determining the relative position between the element and the component without using a supporting foot. A rest position is worthwhile for special cases such as this. It is self-evident that the rest position may be different for different welding positions. By way of example, the position of the supporting foot in FIG. 3 may be a rest position for a welding process on a planar metal sheet 34a, as is shown in FIG. 1.

What is claimed is:

1. A short-time arc welding system, comprising:
   a robot having at least one arm;
   a welding head mounted on the arm, the welding head including a holding apparatus for holding an element to be welded;
   a measurement system operable to determine a relative position between a component and the element held by the holding apparatus, the measurement system including:
      a contact member mounted on the welding head and operable to contact the component during operation of the welding system, the contact member operably determining a relative spacing on a welding axis between the welding head and the component; and
      a positioning device operable to position the contact member between a rest position having the contact member retracted from the component and at least two different operating positions having the contact member in contact with the component;
   wherein the contact member is operable in at least two motions: a linear motion parallel to the welding axis relative to both the component and the welding head, and a rotating motion having the contact member rotatable with respect to the welding head through an angular displacement about the welding axis on which the element is welded to the component.

2. The welding system of claim 1, wherein the arm is moveable on at least one coordinate axis.

3. The welding system of claim 1, wherein the welding head further comprises a linear-movement apparatus for linearly moving the holding apparatus relative to the welding head.

4. The welding system of claim 1, wherein the measurement system further comprises a memory device having a plurality of welding positions stored therein, wherein the operating positions are selectable from the stored welding positions.

5. The welding system of claim 1, wherein the positioning device further includes a plurality of markings used to indicate a plurality of contact member positions relative to the element being held, the markings positionable approximately parallel to the welding axis along which the element is welded to the component.

6. The welding system of claim 1, wherein the positioning device is operable to position the contact member in at least two different positions relative to the element being held, each of the at least two different positions located about an axis which is parallel to a welding axis along which the elements are welded to the components.

7. The welding system of claim 1, wherein the positioning device further comprises a contact member movement sensor operable to detect a position of the contact member.

8. The welding system of claim 1, wherein the welding head further comprises a biasing element operable to elastically bias the holding apparatus in a feed direction of the element.

9. The welding system of claim 1, wherein the measurement system further comprises a welding head movement sensor operable to detect a movement of the holding apparatus relative to the welding head.

10. The welding system of claim 1, wherein the positioning device further comprises a motor operable to position the contact member relative to the welding head.

11. The welding system of claim 10, further comprising a rest state of the motor wherein the motor is operable to apply a resistance torque greater than approximately 150 N with respect to an axial motor movement.

12. The welding system of claim 11, wherein the positioning device further comprises a clamping device operable in the rest state to fix the contact member at least in an axial direction with respect to the element being held.

13. A short-time arc welding system, comprising:
a robot having at least one arm moveable on a plurality of coordinate axes;
a welding head mounted on the arm, the welding head including a holding apparatus for holding an element to be welded;
a measurement system operable to determine a relative position between a component and the element held by the holding apparatus, the measurement system including:
a foot movably mounted on the welding head and operable to contact the component during operation of the welding system, the foot operable to indicate a relative spacing between the welding head and the component;
a positioning device operable to position the foot in at least two different operating positions relative to the element; and
a memory device having a plurality of welding positions stored therein, wherein the operating positions are selectable from the stored welding positions;
wherein the foot is movable in at least two motions with respect to the welding head including a linear motion toward and away from the component approximately parallel to a welding axis on which the element is welded to the component, and a rotating motion having the foot rotatable about the welding head through an angular displacement about the welding axis.

14. The welding system of claim 13, further comprising a pneumatic arrangement connecting the robotic arm to the welding head, operable to move the welding head in a reciprocating motion.

15. The welding system of claim 13, wherein the welding head further comprises a linear-movement apparatus for linearly moving the holding apparatus relative to the welding head, the linear-movement apparatus including a coil and a permanent magnet.

16. The welding system of claim 13, wherein the welding head further comprises a linear-movement apparatus for linearly moving the holding apparatus relative to the welding head, the linear movement apparatus including a linear motor.

17. The welding system of claim 13, further comprising a drive housing mountable to the welding head, the drive housing supporting the positioning device.

18. The welding system of claim 13, further comprising a crown rotatably positionable about the welding head, the crown rotatable with the drive housing.

19. The welding system of claim 18, further comprising a plurality of markings on the crown.

20. The welding system of claim 19, wherein the positioning device further comprises a foot movement sensor operable to detect a position of the foot, wherein the foot movement sensor using the plurality of markings on the crown operably identifies an angular position of the foot.

21. A method for short-time arc welding, in particular for bolt welding of an element to a component using a short-time arc welding system, the arc welding system including a robot having an arm and a welding head fixed to the arm, a foot separate from the welding head and a control device in which one of a plurality of operating positions for the foot is stored for a number of preselectable automatic welding processes, the method comprising the steps of:
a) actuating the robot such that the welding head moves to a welding position for a chosen one of the preselectable welding processes;
b) directing the foot to move to an operating position of the chosen welding process by at least two motions including a linear motion of the foot relative to both the component and the welding head and an angular rotation of the foot about the welding head about a welding axis of the welding head;
c) moving the element towards the component until the foot contacts the component; and
d) performing the chosen welding process.

22. The method according to claim 21, further comprising performing steps (a) and (b) as overlapping steps.

23. The method of claim 21, further comprising sensing a relative position between the element and the component.

24. The method of claim 21, further comprising sensing a relative position between the foot and the welding head.

25. The method of claim 21, further comprising sensing a rotational angle of the foot about the welding axis of the welding head.

26. The method of claim 21, further comprising rotating the foot about an axis of the foot.

27. The method of claim 21, further comprising linearly driving both the welding head and the foot on substantially parallel axes.

28. The method of claim 21, further comprising withdrawing the welding head from the component while maintaining the foot in contact with the component to initiate step (d).

* * * * *